US007015276B2

(12) United States Patent
Morita et al.

(10) Patent No.: US 7,015,276 B2
(45) Date of Patent: Mar. 21, 2006

(54) MELT-MOLDABLE THERMOPLASTIC NORBORNENE RESIN COMPOSITION AND MOLDED ARTICLE AND OPTICAL FILM BOTH COMPRISING THE SAME

(75) Inventors: Takeharu Morita, Osaka (JP); Hiroshi Hiraike, Osaka (JP); Shoji Nozato, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 10/381,590

(22) PCT Filed: Oct. 1, 2001

(86) PCT No.: PCT/JP01/08625

§ 371 (c)(1),
(2), (4) Date: Jul. 24, 2003

(87) PCT Pub. No.: WO02/28966

PCT Pub. Date: Apr. 11, 2002

(65) Prior Publication Data

US 2004/0039122 A1 Feb. 26, 2004

(30) Foreign Application Priority Data

Oct. 2, 2000 (JP) .............................. 2000-302558

(51) Int. Cl.
*C08K 5/54* (2006.01)
*C08L 65/00* (2006.01)

(52) U.S. Cl. .................... 524/553; 524/481; 524/482; 525/210

(58) Field of Classification Search ............... 525/210; 524/481, 482, 553
See application file for complete search history.

(56) References Cited

U.S. PATENT DOCUMENTS

| 3,383,349 | A | * | 5/1968 | Grasley | 524/553 |
| 5,270,393 | A | * | 12/1993 | Sagane et al. | 525/210 |
| 5,831,108 | A | | 11/1998 | Grubbs et al. | 556/21 |
| 5,874,512 | A | * | 2/1999 | Farley et al. | 526/308 |

FOREIGN PATENT DOCUMENTS

| JP | 62-181365 | 8/1987 |
| JP | 4-77520 | 3/1992 |
| JP | 5-39403 | 2/1993 |
| JP | 5-51542 | 3/1993 |
| JP | 5-212828 | 8/1993 |
| JP | 5-279554 | 10/1993 |
| JP | 6-51117 | 2/1994 |
| JP | 7-287122 | 10/1995 |
| JP | 9-221577 | 8/1997 |
| JP | WO 99/00396 | 1/1999 |

OTHER PUBLICATIONS

English language translation of Japanese Patent Hei 3-12448, published Jan. 21, 1991.*
Exxon/Mobil Product Technical Data Sheet for Escorez 5300, dated 2004.*
Abstract XP002299615, of JP9-221577 dated Aug. 26, 1997.
Supplemental European Search Report dated Oct. 20, 2004.

* cited by examiner

*Primary Examiner*—Fred Teskin
(74) *Attorney, Agent, or Firm*—Armstrong, Kratz, Quintos, Hanson & Brooks, LLP

(57) ABSTRACT

A melt-moldable, thermoplastic norbornene resin composition characterized by being obtained by compounding (A) a base polymer comprising a thermoplastic norbornene resin with (B) an olefin compound having a number-average molecular weight of 200 to 10,000 and a softening point of 70 to 170° C.; and a molded article or optical film obtained by melt-molding or extrusion-molding the thermoplastic norbornene resin composition.

19 Claims, No Drawings

MELT-MOLDABLE THERMOPLASTIC NORBORNENE RESIN COMPOSITION AND MOLDED ARTICLE AND OPTICAL FILM BOTH COMPRISING THE SAME

BACKGROUND OF THE INVENTION

1. Field of the Invention

The present invention relates to a melt-moldable, thermoplastic norbornene-based resin composition, and molded article or optical film using the same, more particularly a thermoplastic norbornene-based resin composition having improved moldability, moisture permeability and adhesiveness, among others, and controlled in thermal degradation and defect formation during the melt molding process while retaining the inherent advantages of norbornene-based resin, e.g., heat resistance and transparency, and article or optical film produced by melt-molding the same composition.

2. Description of the Prior Art

Thermoplastic norbornene-based resin composition has been widely used in various areas, centered by optical areas, e.g., lenses (e.g., those for common cameras, video cameras, telescopes, glasses and laser beams), optical disks (e.g., optical video, audio, document filing and memory disks), optical materials (e.g., those for optical fibers), and other optical uses (e.g., image-transferring sheets, various films and other sheets); and other areas, e.g., cases for various electronic devices, window glasses, printed boards, sealants and inorganic or organic binders, in which its excellent properties, e.g., transparency, heat resistance, low moisture absorptivity, low birefringence and moldability, are utilized.

For these optical areas, in particular for optical films, e.g., phase-difference films and polarizing plate protective films, thermoplastic norbornene-based polymer is a suitable resin material. For example, Japanese Patent Laid-open Publication Nos.62-181365 and 6-51117 describe these optical films, discussing that thermoplastic norbornene-based polymer is suitable for the optical films because of its excellent properties, e.g., transparency, heat resistance, low moisture absorptivity, low birefringence and moldability.

However, it involves problems, when used for phase-difference films with an acrylic, pressure-sensitive adhesive agent or the like used for bonding it to a polarizing plate or glass board for liquid-crystal cell, e.g., difficulty for the adhesive agent or the like to exhibit adhesive strength. Similar problems may occur when it is used for a polarizing plate protective film, e.g., insufficient adhesiveness between a polyvinyl alcohol polarizer of very high polarity and norbornene-based polymer of low polarity. Another problem which may be encountered when the polymer of very low moisture permeability is used for a polarizing plate protective film comes from controlled evaporation of moisture in the polarizer to deteriorate optical properties of the polarizing plate during the heat resistance test.

An optical film of thermoplastic norbornene-based polymer has been produced by solution casting, which is unsuitable for mass production because it needs complicated process management which may deteriorate its productivity. Therefore, melt molding processes of higher productivity, e.g., injection molding and extrusion, have been attempted to replace solution casting.

However, melt molding of a norbornene-based polymer, when adopted to produce films, may cause problems, e.g., deteriorated film properties and defective outer appearances caused by decomposition products of the polymer and formation of gel, because the film is exposed to high molding temperature of 250° C. or higher.

Attempts have been made to solve these disadvantages involved in melt molding, e.g., incorporation of norbornene-based polymer with another component, and-modification of the polymer itself.

As one of the former approaches, Japanese Patent Laid-open Publication No.9-221577 proposes a resin composition comprising a thermoplastic norbornene-based resin having a polar group and specific hydrocarbon-based resin. This resin composition, however, involves problems. For example, the molded article of the composition may not have satisfactory optical properties (e.g., haze). Another problem, which may be detrimental, is inapplicability to a thermoplastic norbornene-based resin having poor moisture permeability or the like and containing no polar group. One approach incorporates a thermoplastic norbornene-based resin with a small quantity of polar monomer. However, use of such a monomer is not preferable, because it may cause problems related to compatibility with the resin and its bleeding.

On the other hand, one of the latter approaches decreases molecular weight of a thermoplastic norbornene-based polymer as the starting material. Decreasing the molecular weight, however, may cause a problem of significantly decreased strength of the optical film made of such a polymer.

Under these situations, there are demands for development of novel thermoplastic norbornene-based resin compositions which can be produced by a technique applicable to any type of thermoplastic norbornene-based polymer, whether its base polymer has a polar group or not.

Considering the problems involved in the conventional techniques, it is an object of the present invention to provide a thermoplastic norbornene-based resin composition having improved moldability, moisture permeability and adhesiveness, among others and controlled in thermal degradation and defect formation during the melt molding process while retaining the inherent advantages of norbornene-based resin, e.g., heat resistance and transparency. It is another object of the present invention to provide an article or optical film produced by melt-molding the same composition.

SUMMARY OF THE INVENTION

The inventors of the present invention have found, after having extensively studied to solve the above problems, that incorporation of any thermoplastic norbornene-based resin with a specific olefin-based compound gives a novel thermoplastic norbornene-based resin composition having improved moldability, moisture permeability and adhesiveness, among others, and controlled in thermal degradation and defect formation during the melt molding process while retaining the inherent advantages of norbornene-based resin, e.g., heat resistance and transparency, and that melt molding of the novel resin composition gives a molded article or optical film excellent in, e.g., transparency, heat resistance, low moisture absorptivity, low birefringence, moldability, moisture permeability and adhesiveness, achieving the present invention.

The first aspect of the present invention provides a melt-moldable, thermoplastic norbornene-based resin composition comprising a base polymer (A) composed of thermoplastic norbornene-based resin incorporated with an olefin-based compound (B) having a number-average molecular weight of 200 to 10,000 and softening point of 70 to 170° C.

The second aspect of the present invention provides the thermoplastic norbornene-based resin composition of the first aspect, wherein the base polymer (A) is a norbornene-based resin having no polar group.

The third aspect of the present invention provides the thermoplastic norbornene-based resin composition of the first aspect, wherein the olefin-based compound (B) has a number-average molecular weight of 500 to 5,000.

The fourth aspect of the present invention provides the thermoplastic norbornene-based resin composition of the first aspect, wherein the olefin-based compound (B) is an alicyclic olefin or polymer thereof.

The fifth aspect of the present invention provides the thermoplastic norbornene-based resin composition of the fourth aspect, wherein the alicyclic olefin or polymer thereof has a polar group.

The sixth aspect of the present invention provides the thermoplastic norbornene-based resin composition of the fourth or fifth aspect, wherein the alicyclic olefin or polymer thereof is a compound having a cyclopentene or norbornene ring.

The seventh aspect of the present invention provides the thermoplastic norbornene-based resin composition of the sixth aspect, wherein the alicyclic olefin or polymer thereof is a hydrogenation product.

The eighth aspect of the present invention provides the thermoplastic norbornene-based resin composition of one of fifth to seventh aspects, wherein the alicyclic olefin or polymer thereof having a polar group is a product obtained by metathesis polymerization of a given norbornene-based monomer. The ninth aspect of the present invention provides the thermoplastic norbornene-based resin composition of one of fifth to seventh aspects, wherein the alicyclic olefin or polymer thereof having a polar group is a product obtained by metathesis polymerization of a given norbornene-based monomer in the presence of a chain transfer agent containing a functional group.

The tenth aspect of the present invention provides the thermoplastic norbornene-based resin composition of one of fifth to ninth aspects, wherein the polar group is a functional group having active hydrogen selected from the group consisting of carboxyl, hydroxyl, amino, amide and silyl group.

The $11^{th}$ aspect of the present invention is the thermoplastic norbornene-based resin composition of the first aspect, wherein the olefin-based polymer (B) is incorporated at 0.01 to 100 parts by weight per 100 parts by weight of the base polymer (A). The $12^{th}$ aspect of the present invention is the thermoplastic norbornene-based resin composition of the $11^{th}$ aspect, wherein the olefin-based polymer (B) is incorporated at 0.01 to 15 parts by weight per 100 parts by weight of the base polymer (A).

The $13^{th}$ aspect of the present invention is the thermoplastic norbornene-based resin composition of the $11^{th}$ or $12^{th}$ aspect, wherein the olefin-based polymer (B) is incorporated in the base polymer (A) to an extent to keep glass transition temperature reduced by 20° C. or less.

The $14^{th}$ aspect of the present invention is the thermoplastic norbornene-based resin composition of one of the first to $13^{th}$ aspects, which has a melt viscosity of 3,000 Pa·s or less at 280° C. and 100 to 13,000 Pa·s at 230° C., and glass transition temperature of 100 to 190° C.

The $15^{th}$ aspect of the present invention is a molded article produced by melt molding of the thermoplastic norbornene-based resin composition of one of the first to $14^{th}$ aspects.

The $16^{th}$ aspect of the present invention is an optical film produced by extrusion molding of the thermoplastic norbornene-based resin composition of one of the first to $14^{th}$ aspect.

The $17^{th}$ aspect of the present invention is the optical film of the $16^{th}$ aspect, which has a total light transmittance of 60 to 100%. The $18^{th}$ aspect of the present invention is the optical film of the $16^{th}$ aspect, which has a tear strength of 0.1N or more.

The $19^{th}$ aspect of the present invention is the optical film of one of the $16^{th}$ to $18^{th}$ aspects, which has a haze of 20% or less.

DETAILED DESCRIPTION OF THE INVENTION

The present invention relates to a melt-moldable, thermoplastic norbornene-based resin composition comprising a base polymer (A) composed of thermoplastic norbornene-based resin incorporated with an olefin-based compound (B) having specific properties, and-molded article or optical film using the same. The thermoplastic norbornene-based resin composition and molded article or optical film using the same of the present invention are described in detail.

1. Base Polymer (A)

The base polymer (A) incorporated in the thermoplastic norbornene-based resin composition of the present invention is composed of a thermoplastic norbornene-based resin.

The thermoplastic norbornene-based resin is not limited, and any one can be used so long as it is norbornene-based. The known thermoplastic norbornene-based resins include (a) hydrogenation product of ring-opened polymer (including copolymer) of norbornene-based monomer, and (b) copolymer of norbornene-based monomer and olefin-based monomer, e.g., ethylene and/or alpha-olefin. They are substantially free of unsaturated bond.

The norbornene-based monomers as the starting compounds for the thermoplastic norbornene-based resins are described in Japanese Patent Laid-open Publication Nos.5-39403 and 5-212828, and Japanese Patent Nos.3,038,825, 3,019,741 and 3,030,953, among others. They include norbornene, methanooctahydronaphthalene, dimethanooctahydronaphthalene, dimethanododecahydroanthracene, dimethanodecahydroanthracene, trimethanododecahydroanthracene, which may be substituted; and dicyclopentadiene, 2,3-dihydrocyclopentadiene, methanooctahydrobenzoindene, dimethanooctahydrobenzoindene, methanodecahydrobenzoindene, dimethanodecahydrobenzoindene, methanooctahydrofluorene and dimethanooctahydrofluorene, which may be substituted.

These norbornene-based monomers may be used either individually or in combination.

The substituent for the above compounds may be hydrocarbon or polar group, so long as it is known. Some of the examples include alkyl, alkylidene, aryl, cyano, alkoxycarbonyl and pyridyl group, and halogen atom. The specific examples include 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene and 5-phenyl-2-methyl-2-norbornene.

Number-average molecular weight (determined by GPC as the standard polystyrene, solvent: THF- or cyclohexane-based one) of the thermoplastic norbornene-based resin is not limited. However, it is normally 5,000 to 40,000, preferably 7,000 to 35,000, more preferably 8,000 to 30,000. A thermoplastic norbornene-based resin having a number-average molecular weight of less than 5,000 is not desirable, because the molded article (in particular optical film or the like) of the resulting composition may have an insufficient mechanical strength. The one having a number-average molecular weight of more than 40,000 is also not desirable, because it may be insufficiently moldable.

The thermoplastic norbornene-based resin to be used as the base polymer (A) for the present invention may or may not have a polar group, as discussed earlier. A polar group may be present in the thermoplastic norbornene-based resin within limits not harmful to properties (e.g., optical properties and moldability) of the composition of the present invention. Presence of a polar group is rather preferable to impart adequate moisture permeability to the molded article.

The polar groups useful for the present invention include, but not limited to, halogen (chlorine, bromine and fluorine), hydroxyl, carboxylic acid, ester, amino, anhydrous acid, cyano, silyl, epoxy, acrylic and methacrylic. Of these, ester and anhydrous acid groups are more preferable as the substituents which can give reactivity to the compound substituted therewith by deprotection.

Of the above-described thermoplastic norbornene-based resins, the commercially available ones include ARTON™ (JSR) as the one having a polar group, and ZEONOR™ (Zeon) as the one having no polar group.

2. Olefin-Based Compound (B)

The olefin-based compound (B) to be incorporated in the thermoplastic norbornene-based resin composition of the present invention is an olefin compound or polymer thereof having specific properties, i.e., number-average molecular weight of 200 to 10,000 and softening point of 70 to 170° C., as discussed below.

The olefin compound or polymer thereof is not limited, so long as it satisfies the above properties. However, it is preferably an alicyclic olefin, oligomer or polymer thereof, and hydrogenation product thereof.

Number average molecular weight (determined by GPC as the standard polystyrene, solvent: chloroform) of the olefin-based compound (B) is normally 200 to 10,000, preferably 200 to 5,000, more preferably 500 to 5,000. It is particularly preferably 1,000 to 4,000, viewed from optical properties of the resulting composition. An olefin-based compound having a number-average molecular weight of less than 200 is not desirable, because the optical film or the like of the resulting composition may have an insufficient tear strength. The one having a number-average molecular weight of more than 10,000 is also not desirable, because the compound will show the effect of improving moldability of the composition to only a limited extent, and the effect of incorporating an olefin-based compound is little exhibited.

The olefin-based compound having a number-average molecular weight of less than 500 is highly volatile, and incorporation of the compound at 15% by weight or more based on the thermoplastic norbornene-based resin is not desirable, because it may foam to make the resin turbid white.

Softening point of the olefin-based compound (B) is 70 to 170° C., preferably 80 to 150° C., more preferably 90 to 140° C. An olefin-based compound having a softening point of lower than 70° C. is not desirable, because the thermoplastic norbornene-based resin composition incorporated with such a compound may be insufficient heat resistance. It is also not desirable viewed from properties of the molded planes and article. An olefin-based compound having a softening point of higher than 170° C. is also not desirable, because the effect of incorporating an olefin-based compound is little exhibited.

The softening point is defined as the temperature at which the internal voids disappear to make the compound an externally uniform, transparent body or phase having an uneven stress distribution inside. Bubbles may sometimes enter the sample inside. However, the softening point depends on retardation and elastic relaxation properties of the sample, and heating rate and compressive load.

The softening point can be measured by a flow tester, e.g., Shimadzu Corp.'s CFT-500C, by the heating method, in which the sample is heated at a constant rate during the testing period. This testing method can continuously measure the softening point while the sample is transformed from the solid state to transition, rubber-like elastic and eventually fluidized state.

This type of tester allows to determine not only shear rate and viscosity of the sample at each temperature in the fluidized state, but also temperature (Tfb) at which the sample, under going from the solid state to fluidized state via the transition state, starts to flow. This temperature (Tfb), at which the sample starts to flow, is defined as softening point for the present invention.

Examples of the alicyclic olefins include those having a cyclohexene, cydopentene, cyclooctene or norbornene ring in the structure. Of these, particularly preferable ones are those having a cyclopentene or norbornene ring. Moreover, these alicyclic olefins may be prepared by another reaction to structurally have two or more olefin monomers.

The process for synthesizing the oligomer or polymer of the alicyclic olefin or hydrogenation product thereof, as the preferable compound for the olefin-based compound (B), is not limited. For example, it may be synthesized by metathesis polymerization or Diels-Alder reaction of a cyclopentene-, cyclopentadiene- or norbornene-based monomer. More specifically, these compounds include a commonly available petroleum resin and oligomer synthesized by ring-opening metathesis polymerization of a norbornene-based monomer.

The commercially available petroleum resins useful for the present invention include Arakawa Chemical Industries' ARKON™, Yasuhara Chemical Industries' YS Polyster™ and Crealon™, Tonex's Escorez™, of which Tonex's Escorez™ is particularly preferable.

The oligomer synthesized by metathesis polymerization of a norbornene-based monomer is preferably the one whose molecular weight is controlled by incorporating a common metathesis polymerization catalyst and chain transfer agent in the norbornene-based monomer.

For the chain transfer agent, a chain compound having an unsaturated bond is used. This type of agent can control molecular weight of the oligomer. The compounds having an unsaturated bond to work as the chain transfer agent include alpha-olefins, e.g., 1-butene, 1-pentene, 1-hexene, 1-octene and 1-decene, which may be substituted with a functional group.

A common metathesis polymerization catalyst may be used as the polymerization catalyst for synthesizing the oligomer by the ring-opening metathesis polymerization. However, a ruthenium-based complex is particularly preferable for its stability and high activity for synthesizing the oligomer on an industrial scale or oligomer having a functional group.

The preferable ruthenium-based complex catalyst is a high-activity one which can be used in air and is not very sensitive to water. These catalysts include a ruthenium (or osmium) alkylidene complex catalyst disclosed by U.S. Pat. No. 5,831,108, and ruthenium complex catalyst excellent in resistance to heat and oxygen and in reaction controllability, developed by this applicant. Of these, particularly preferable ruthenium-based complexes are those represented by the general formulae (1) to (4):

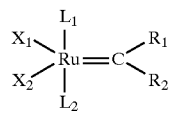
(1)

In the general formula (1), $R_1$ and $R_2$ which may be the same or different, are each hydrogen, an alkenyl group of 2 to 20 carbon atoms, alkyl group of 1 to 20 carbon atoms, aryl group of 6 to 20 carbon atoms, carboxyl group of 2 to 20 carbon atoms, alkoxy group of 2 to 20 carbon atoms, alkenyloxy group of 2 to 20 carbon atoms, aryloxy group of 6 to 20 carbon atoms, alkoxycarbonyl group of 2 to 20 carbon atoms, alkylthio group of 2 to 20 carbon atoms or ferrocene derivative, which may be substituted, as required, with phenyl substituted with an alkyl group of 1 to 5 carbon atoms, halogen atom or alkoxy group of 1 to 5 carbon atoms.

$X_1$ and $X_2$, which may be the same or different, each means any anionic ligand, preferably Cl or Br, more preferably Cl.

$L_1$ and $L_2$, which may be the same or different, each means any neutral electron donor, preferably phosphorus-based ligand. The preferable phosphorus-based ligands include a phosphine represented by the formula PR'R"R'", wherein R', R" and R'" are each an alkyl group of 1 to 20 carbon atoms or aryl group of 6 to 20 carbon atoms, and preferably selected from the group consisting of methyl, ethyl, isopropyl, t-butyl, cyclohexyl, phenyl and substituted phenyl. Each may be selected twice or more. More specifically, these ligands include —P(cydohexyl)$_3$, —P(phenyl)$_3$ and —P(isopropyl)$_3$.

Moreover, as $L_1$ or $L_2$, an imidazolium compound is suitably used. More specifically, these compounds include an imidazolin-2-ylidene and 4,5-dihydroimidazolin-2-ylidene derivative. Still more specifically, they include an N,N'-dimesitylimidazolin-2-ylidene and N,N'-dimesityl-4,5-dihydroimidazolin-2-ylidene ligand.

Moreover, $L_1$ and $L_2$ may together form a molecule to be bidentate-coordinated.

Still more, two or three of $X_1$, $X_2$, $L_1$ and $L_2$ may be combined with each other to form a multidentate chelated ligand.

In the general formula (1), $L_1$ and $L_2$ are described to be trans-positioned. However, they may be cis-positioned depending on steric bulk density of the compound, or when they form a molecule to be bidentate-coordinated.

Moreover, $X_1$ and $X_2$ are described to be cis-positioned. However, they may be trans-positioned depending on type of $L_1$ or $L_2$.

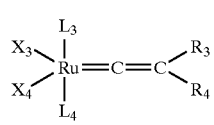
(2)

In the general formula (2), $R_3$ and $R_4$, which may be the same or different, are each hydrogen, an alkenyl group of 2 to 20 carbon atoms, alkyl group of 1 to 20 carbon atoms, aryl group of 6 to 20 carbon atoms, carboxyl group of 2 to 20 carbon atoms, alkoxy group of 2 to 20 carbon atoms, alkenyloxy group of 2 to 20 carbon atoms, aryloxy group of 6 to 20 carbon atoms, alkoxycarbonyl group of 2 to 20 carbon atoms, alkylthio group of 2 to 20 carbon atoms, alkylsilyl group of 2 to 20 carbon atoms, arylsilyl group of 2 to 20 carbon atoms or ferrocene derivative, which may be substituted, as required, with phenyl substituted with an alkyl group of 1 to 5 carbon atoms, halogen atom or alkoxy group of 1 to 5 carbon atoms.

It should be noted, when an alkylsilyl or arylsilyl group is used as $R_3$, that it may be positioned twice or more on the silicon atom for stability of the complex. In such a case, it is preferably selected from the group consisting of methyl, ethyl, isopropyl, t-butyl, cyclohexyl and phenyl. More specifically, these groups include trimethylsilyl, triethylsilyl, diphenylmethylsilyl, dimethyl-t-butylsilyl and triisopropylsilyl. In this case, the preferable groups as $R_4$ include t-butyl, n-butyl, n-propyl, isopropyl, ethyl, methyl, methoxymethyl, ferrocenyl, trimethylsilyl, phenyl, tolyl and anisyl, viewed from stability and activity of the complex.

$X_3$ and $X_4$, which may be the same or different, each means any anionic ligand, preferably Cl or Br, more preferably Cl.

$L_3$ and $L_4$, which may be the same or different, each means any neutral electron donor, preferably phosphorus-based ligand. The preferable phosphorus-based ligands include a phosphine represented by the formula PR'R"R'", wherein R', R" and R'" are each an alkyl group of 1 to 20 carbon atoms or aryl group of 6 to 20 carbon atoms, and preferably selected from the group consisting of methyl, ethyl-, isopropyl, t-butyl, cyclohexyl, phenyl and substituted phenyl. Each may be selected twice or more. More specifically, these ligands include —P(cyclohexyl)$_3$, —P(phenyl)$_3$ and —P(isopropyl)$_3$.

Moreover, as $L_3$ or $L_4$, an imidazolium compound is suitably used. More specifically, these compounds include an imidazolin-2-ylidene and 4,5-dihydroimidazolin-2-ylidene derivative. Still more specifically, they include an N,N'-dimesitylimidazolin-2-ylidene and N,N'-dimesityl-4,5-dihydroimidazolin-2-ylidene ligand.

Moreover, $L_3$ and $L_4$ may together form a molecule to be bidentate-coordinated.

Still more, two or three of $X_3$, $X_4$, $L_3$ and $L_4$ may be combined with each other to form a multidentate chelated ligand.

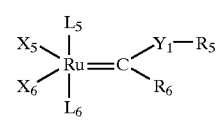
(3)

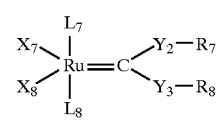
(4)

In the general formula (3) or (4), $R_5$, $R_6$, $R_7$ and $R_8$, which may be the same or different, are each hydrogen, an alkenyl group of 2 to 20 carbon atoms, alkyl group of 1 to 20 carbon atoms, aryl group of 6 to 20 carbon atoms, carboxyl group of 2 to 20 carbon atoms, alkoxy group of 2 to 20 carbon atoms, alkenyloxy group of 2 to-20 carbon-atoms, aryloxy group of 6 to 20 carbon atoms, alkoxycarbonyl group of 2 to 20 carbon atoms, alkylthio group of 2 to 20 carbon atoms or ferrocene derivative, which may be substituted, as required, with phenyl substituted with an alkyl group of 1 to 5 carbon atoms, halogen atom or alkoxy group of 1 to 5 carbon atoms.

In this case, $R_5$, $R_7$ and $R_8$ are preferably each an alkyl group of 1 to 20 carbon atoms, cyclohexyl group, phenyl group, alkyloxy group of 1 to 5 carbon atoms, carboxyl group, alkylsilyl group of 1 to 5 carbon atoms, hydroxyl group, nitro group, halogen, amino group of 5 carbon atoms or less, acetyl group or phenyl group substituted with acetoxy group. Of these, more preferable groups are phenyl, o-tolyl, p-tolyl, 2,6-xylyl, anisyl, nitrobenzene, chlorobenzene, o-isopropylphenyl, 2,6-diisopropylphenyl, ethyl, isopropyl, t-butyl and cyclohexyl.

$Y_1$, $Y_2$ and $Y_3$, which may be the same or different, each means elemental sulfur, oxygen or selenium, of which sulfur or selenium is more preferable.

$X_5$, $X_6$, $X_7$ and $X_8$, which may be the same or different, each means any anionic ligand, preferably Cl or Br, more preferably Cl.

$L_5$, $L_6$, $L_7$ and $L_8$, which may be the same or different, each means any neutral electron donor, preferably phosphorus-based ligand. The preferable phosphorus-based ligands include a phosphine represented by the formula PR'R"R'", wherein R', R" and R'" are each an alkyl group of 1 to 20 carbon atoms or aryl group of 6 to 20 carbon atoms, and preferably selected from the group consisting of methyl, ethyl, isopropyl, t-butyl, cyclohexyl, phenyl and substituted phenyl. Each may be selected twice or more. More specifically, these ligands include —P(cyclohexyl)$_3$, —P(phenyl)$_3$ and —P(isopropyl)$_3$.

Moreover, as $L_5$, $L_6$, $L_7$ or $L_8$, an imidazolium compound is suitably used. More specifically, these compounds include an imidazolin-2-ylidene and 4,5-dihydroimidazolin-2-ylidene derivative. Still more specifically, they include an N,N'-dimesitylimidazolin-2-ylidene and N,N'-dimesityl-4,5-dihydroimidazolin-2-ylidene ligand.

Moreover, $L_5$, $L_6$, $L_7$ and $L_8$ may together form a molecule to be bidentate-coordinated.

Still more, two or three of $X_5$, $X_6$, $X_7$, $X_8$, $L_5$, $L_6$, $L_7$ and $L_8$ may be combined with each other to form a multidentate chelated ligand.

The complex represented by one of the formulae (1) to (4) may be produced by a variety of processes. One of the representative processes synthesizes a starting compound for the ligand precursor or the like having some of $L_1$ to $L_8$ and the like by a known process, synthesizes a starting compound for a ruthenium-based complex precursor also by a known process, and finally mixes these starting compounds to produce the target complex by the ligand exchanging reaction.

The metathesis polymerization catalyst for synthesizing the norbornene- or cyclopentene-based oligomer for the present invention is incorporated normally at 0.0001 to 1% by mol based on the total norbornene-based monomers, preferably 0.001 to 0.5%, more preferably 0.001 to 0.05%. At below 0.0001%, the norbornene-based monomer is polymerized at an insufficient rate and hence not desirable. At above 1%, on the other hand, the system is disadvantageous costwise and hence not desirable.

Reaction temperature for the above synthesis process varies depending on melting point and boiling point of the solvent used. However, it is normally −30 to 150° C., preferably 10 to 150° C. Temperature lower than −30° C. is not desirable for incorporation of an organometallic compound catalyst, because of insufficient fluidity of the monomer. Temperature higher than 150° C. is also not desirable, because the metathesis catalyst tends to be deactivated.

The metathesis polymerization for the present invention can be carried out in a solvent, whether it is compatible with the monomer or not. The solvents compatible with the monomer include saturated hydrocarbons, e.g., pentane and hexane; aromatics, e.g., benzene and toluene; halides, e.g., methylene chloride and chloroform; ethers, e.g., diethyl ether and 1,2-dimethoxyethane; and esters, e.g., methyl acetate and ethyl acetate. Those not compatible with the monomer include water and alcohols.

The metathesis polymerization for the present invention is preferably carried out in an inert atmosphere. However, it may be carried out in air in the presence of a stable Ru-based catalyst. An oligomer produced by metathesis polymerization generally has a double bond, and in particular the one produced by the polymerization process for the present invention may be deteriorated by oxygen in air or the like. In order to prevent deterioration of the oligomer, an antioxidant may be incorporated in the polymerization system.

The antioxidant useful for the present invention is not limited, so long as it is inert to the polymerization reaction. The particularly preferable antioxidants include pentaerythritol-tetrakis[3-(3-di-t-butyl-4-hydroxyphenyl)propionate], 1,3,5-trimethyl-2,4,6-tris(3,5-t-butyl-4-hydroxybenzyl)benzene, 2,6-di-t-butyl-4-methylphenol, tris-(3,5-di-t-butyl-4-hydroxybenzyl)isocyanurate and 1,3,5-tris-(4-t-butyl-3-hydroxy-2,6-dimethyldibenzyl)isocyanurate.

The olefin-based compound (B) for the present invention is preferably free of unsaturated bond in consideration of heat resistance. For this reason, an unsaturated bond, when present in the compound, is preferably treated with hydrogen. The hydrogenation catalysts useful for the present invention include Wilkinson complex, cobalt acetate/triethyl aluminum, nickel acetylacetate/triisobutyl aluminum, palladium-carbon, ruthenium complex, ruthenium-carbon-and nickel-diatomaceous earth.

The hydrogenation process for the present invention may be carried out in a homogeneous or heterogeneous system, depending on type of catalyst used, normally at a hydrogen pressure of 1 to 200 atms and 0 to 250° C.

The ruthenium-based complex catalyst represented by one of the general formulae (1) to (4), when used for synthesizing a norbornene- or cyclopentene-based oligomer, suitably works not only for metathesis polymerization but also for hydrogenation, and synthesis and hydrogenation of the oligomer can be carried out continuously.

The olefin-based compound for the present invention will have fairly different properties (in particular moisture permeability) whether it is of a norbornene-based oligomer (or cyclopentene-based oligomer or hydrogenation product thereof) or another compound, and its effect when incorporated in the base polymer should be widely varying. It is therefore preferable to select an adequate compound as the olefin-based compound (B) according to type of the base polymer.

In other words, when the base polymer is a thermoplastic norbornene-based resin having a polar group, which is highly moisture permeable, use of a norbornene- or cyclopentene-based oligomer or hydrogenation product thereof having a polar group, which is highly moisture permeable, is not highly cost-benefit effective. On the other hand, when the base polymer is a thermoplastic norbornene-based resin having no polar group, which is poorly moisture permeable, use of a norbornene- or cyclopentene-based oligomer or hydrogenation product thereof having a polar group, which is highly moisture permeable, is effective and hence desirable.

In such a case, the polar groups useful for the present invention include, but not limited to, halogen (chlorine, bromine and fluorine), hydroxyl, carboxylic acid, ester, amino, anhydrous acid, cyano, silyl, epoxy, acrylic and methacrylic. Of these, ester and anhydrous acid groups are more preferable as the substituents which can give reactivity to the compound substituted therewith by deprotection.

The processes for producing the norbornene- or cyclopentene-based oligomer having a polar group include metathesis polymerization of a norbornene-based monomer having a polar group, and metathesis polymerization of a norbornene-based monomer in the presence of a chain transfer agent containing a polar group.

The norbornene-based oligomer having a polar group useful for the present invention is not limited. For example, a compound represented by the general formula (5) can be used.

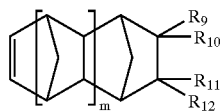

(5)

In the general formula (5), $R_9$ to $R_{12}$ are each hydrogen atom, a hydrocarbon group of 1 to 10 carbon atoms or monovalent organic group, where at least one of $R_9$ to $R_{12}$ is a polar group; and "m" is 0 to 2. The polar group is preferably a functional group, e.g., the one having active hydrogen selected from the group consisting of carboxyl, hydroxyl, amino, amide and silyl group.

More specifically, examples of the norbornene-based monomers having a polar group represented by the general formula (5) include 5-norbornene-2-methanol, norborneneol, exo-2-norbornyl formate, 5-norbornene-2-endo, 3-exo-dicarboxylic acid and 5-norbornene-2,2-dimethanol.

For the chain transfer agent having a polar group, on the other hand, a compound having an unsaturated bond and polar group is used. Use of such a compound can control molecular weight of the polymerization product. The unsaturated bond portion in the chain transfer agent reacts with the monomer during the polymerization process, adding itself to one or both ends of the resulting oligomer. As such, it can quantitatively introduce the polar group in the oligomer. Moreover, molecular weight of the norbornene- or cyclopentene-based oligomer can be controlled by adjusting content of the chain transfer agent.

Structure of the chain transfer agent for the above purpose is not limited, so long it has an unsaturated bond and polar group. A compound having a structure represented by the general formula (6) can be cited as the example for the chain transfer agent having an unsaturated bond and polar group:

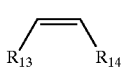

(6)

In the general formula (6), $R_{13}$ and $R_{14}$ are independent from each other, and structurally not limited. Each may be hydrocarbon, alkoxy, alkylthio, alkylsilyl or alkenyloxy group. At least one of $R_{13}$ and $R_{14}$ is a functional group containing active hydrogen, or another functional group.

More specifically, the compounds represented by the general formula (6) include allyl acetate, allyl alcohol, vinyl acetate, 2-butene-1,4-diol, cis-1,4-diacetoxy-2-butene, acrylic acid, methacrylic acid, acrolein, acrylonitrile, vinyl chloride, maleic acid and fumaric acid. Even when a norbornene-based monomer having the above polar group is metathesis-polymerized into an oligomer, its molecular weight can be controlled by use of a chain compound having an unsaturated bond as the chain transfer agent.

The polar group in the norbornene-based or cyclopentene-based oligomer for the present invention preferably contains active hydrogen. Its structure is not limited. However, the particularly preferable polar groups include carboxyl, hydroxyl, amino, amide and silyl, because they can improve moisture permeability and adhesiveness by a small quantity.

The olefin-based compound (B) for the present invention is incorporated normally at 0.01 to 100 parts by weight per 100 parts by weight of the base polymer (A), preferably 0.01 to 15 parts, more preferably 3 to 10 parts.

At below 0.01 parts, the olefin-based compound may not sufficiently exhibit its effect and hence is not desirable. At above 100 parts, on the other hand, the product resin composition may have deteriorated heat resistance and moldability.

Content of the olefin-based compound (B) is determined from a different angle to retain heat resistance and moldability of the thermoplastic norbornene-based resin composition as the product. The olefin-based polymer (B) is incorporated in the base polymer (A) preferably to an extent to keep glass transition temperature reduced by 20° C. or less. Incorporation of the olefin-based polymer (B) to an extent to reduce the glass transition temperature by more than 20° C. is not desirable, because it may deteriorate heat resistance as the inherent property of the norbornene-based resin and greatly limit its applicable areas, e.g., optical films.

3. Other Additives

The thermoplastic norbornene-based resin composition of the present invention may be incorporated with, in addition to the essential components of the base polymer (A) and olefin-based compound (B), one or more known additives, e.g., antioxidant, UV absorber, lubricant and antistatic agent, within limits not harmful to the object of the present invention.

The antioxidants useful for the present invention include 2,6-di-t-butyl-4-methylphenol, 2,2'-dioxy-3,3'-di-t-butyl-5, 5'-dimethyldiphenylmethane and tetrakis[methylene-3-(3,5-di-t-butyl-4-hydroxyphenyl)propionate]methane; and UV absorbers useful for the present invention include 2,4-dihydroxybenzophenone and 2-hydroxy-4-methoxybenzophenone.

4. Thermoplastic Norbornene-Based Resin Composition

The thermoplastic norbornene-based resin composition of the present invention is prepared by incorporating the base polymer (A) with a given content of the olefin-based compound (B) and, as required, one or more of the optional components described above.

The resulting thermoplastic norbornene-based resin composition should have the following properties with respect to melt viscosity and glass transition temperature so that it can be treated by melt molding, e.g., extrusion or injection molding.

First, preferable melt viscosity at 280° C. is normally 3,000 Pa·s or less, determined by a flow tester, more preferably 1,000 Pa·s. Melt viscosity at 280° C. above 3,000

Pa·s may deteriorate moldability of the resin composition. Increasing molding temperature to decrease melt viscosity is not desirable, because it may degrade the resin.

Preferable melt viscosity at 230° C. is normally 100 to 13,000 Pa·s, more preferably 200 to 10,000 Pa·s, still more preferably 300 to 8,000 Pa·s. Melt viscosity at 230° C. below 100 Pa·s is not desirable, because it may deteriorate heat resistance of the resin composition, and also may be too low for smooth extrusion molding. Melt viscosity at 230° C. above 13,000 Pa·s is also not desirable, because it is excessively high and may deteriorate moldability of the resin composition.

Second, preferable glass transition temperature is normally 100 to 190° C., more preferably 120 to 170° C. Glass transition temperature below 100° C. is not desirable, because the molded article, e.g., film, of the resin composition may be insufficiently resistant to heat. The level above 190° C. is also not desirable, because the molding process needs high temperature which may cause degradation of the resin.

5. Molded Article or Optical Film

The thermoplastic norbornene-based resin composition of the present invention may be melt-molded by a known method, in particular extrusion, injection or compression molding, into an article. It may be molded into a film by casting. The molded article may be coated with a hard coat of inorganic compound, organic silicon compound (e.g., as a silane coupling agent), resin (e.g., acrylic-based, vinyl-based, melamine, epoxy, fluorine-based or silicone resin) or the like. The hard coat may be provided by a known means, e.g., curing by the aid of heat or UV, vacuum deposition, sputtering or ion plating. The molded article, when coated with a hard coat, can have improved properties, e.g., heat resistance, optical properties, resistance to chemicals or wear, or moisture permeability.

Applicable areas for the thermoplastic norbornene-based resin composition of the present invention are not limited. It can be widely used in various areas, e.g., optical displays centered by image-transferring sheets and various other films and sheets (e.g., liquid-crystal, EL and plasma displays), lenses (e.g., those for common cameras, video cameras, telescopes, glasses and laser beams), optical disks (e.g., optical video, audio, document filing and memory disks), and optical materials (e.g., those for optical fibers). It may be also suitably applicable to other areas, e.g., cases for various electronic devices, window glasses, printed boards, sealants and inorganic or organic binders.

Of these, the areas in which excellent properties characteristic of the thermoplastic norbornene-based resin composition of the present invention, e.g., moldability and heat resistance, are fully utilized are optical films, e.g., phase-difference films and polarizing plate protective films.

The optical film of the present invention is manufactured by extrusion for cost consideration. It is normally 10 to 300 μm thick. It is much superior to the conventional optical film in total light transmittance, tear strength and haze, as discussed below.

Total light transmittance of the film is normally 60 to 100%, preferably 70 to 100%, more preferably 80 to 100%. Total light transmittance below 60% is not desirable, because it may limit the optical film applicable areas.

The film should have a tear strength of 0.1N or more. Tear strength below 0.1N may limit the film applicable areas, and this tendency will be particularly noted when the film is thin at 10 μm or less.

Moreover, the optical film of the present invention should have a haze of 20% or less, preferably 10% or less, more preferably 5% or less. Haze below 20% is not desirable, because it may limit the film applicable areas.

As discussed above, the thermoplastic norbornene-based resin composition is very useful, because it can be widely used for various areas, not limited to optical areas.

EXAMPLES and COMPARATIVE EXAMPLES

The present invention is described in more detail by EXAMPLES, which by no means limit the present invention. The analytical procedures used in EXAMPLES to determine the properties are described below.

(1) Measurement of molecular weight by GPC: Molecular weight was measured using Tosoh's HLC-8020 and autosampler AS-8020, data analyzer SC-8020 and Shodex's column K-806L (2 columns were used) under the conditions of flow rate: 1 mL/minute, oven temperature: 40° C., refractometer temperature: 40° C., sample concentration: about 0.1% by weight, injected sample volume: 300 μL, solvent: chloroform, and standard sample: standard polystyrene.

(2) Softening temperature: Softening point was measured by a Shimadzu Corp.'s flow tester CFT-500C under the following conditions:

Extrusion pressure: 0.9806 MPa (accuracy: within ±1% of the set level)

Heating method: Electrical heater (500W)

Cylinder temperature: Heating rate: 6° C./minute (control accuracy: ±0.2° C.)

Stroke: Measurable range: 15 mm

Detector: Linear type potentiometer (measurement accuracy: ±0.5%)

Resolution: 0.01 mm

Sample volume: max. 1.5 cm$^3$

Cylinder Diameter: 11.329+0.005/0 mm

Piston Diameter: 11.282+0.002/0 mm

Standard die: 1.0±0.01 (diameter) by 10.0±0.005 mm (length)

(3) Melt viscosity: Melt viscosity was measured at 230 and 280° C. by the method similar to that for (2).

(4) Glass transition temperature: Glass transition temperature was measured by a TA Instruments' DSC2920 Modulated DSC under the following temperature program conditions, where glass transition temperature determined in the final heating step was defined as the glass-transition temperature of the present invention.

Temperature was increased at 10° C./minute from room temperature to 50° C., at which the sample was held isothermally for 5 minutes.

Temperature was increased at 10° C./minute from −50° C. to 200° C., at which the sample was held for 5 minutes.

Temperature was decreased at 10° C./minute from 200° C. to −50° C., at which the sample was held for 5 minutes.

Temperature was increased at 10° C./minute from −50° C. to 200° C., at which the sample was held for 5 minutes.

(5) Total light transmittance: Total light transmittance was measured in accordance with JIS K-7150.

(6) Haze: Haze was measured in accordance with JIS K-7150.

(7) Tear strength: Tear strength was measured in accordance with JIS K-7128 (right angle die).

(8) Outer appearances: Outer appearances of the film were visually observed to count spot defects (measured area: 10 m$^2$) by transmission, and evaluated according to the following standards:

⊚: 3 defects/m² or less
O: 4 to 9 defects/m²
X: 10 defects/m² or more

Catalyst Synthesis Example 1

A 300 mL flask was charged with 2.79 g (9.1 mmols) of Ru(p-cymene)Cl$_2$, to which 18.2 mmols of PCy$_3$ and 9.1 mmols of t-butyl acetylene were added together with 150 mL of toluene, and the reaction was allowed to proceed in a flow of nitrogen for 7 hours. On completion of the reaction, the effluent was distilled under a vacuum to remove toluene, and recrystallized in a THF/ethanol system, to synthesize a ruthenium complex compound represented by the formula (7):

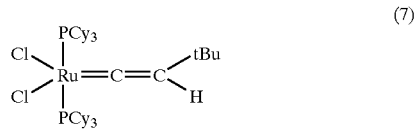

(7)

Catalyst Synthesis Example 2

A ruthenium complex compound represented by the formula (8) was prepared in accordance with the procedure described by U.S. Pat. No. 5,831,108:

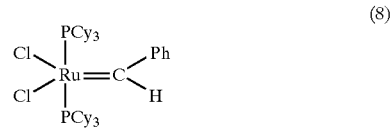

(8)

Catalyst Synthesis Example 3

A ruthenium complex compound represented by the formula (9) was prepared in accordance with the procedure described by WO99/00396:

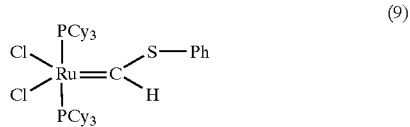

(9)

Oligomer Synthesis Example 1

A solution was prepared by dissolving 4.46 g (1/10 equivalents of norbornene) of 1-hexene and 217 mg (1/2,000 equivalents of norbornene) of the ruthenium complex represented by the formula (7) in 10 mL of toluene, and put slowly in a solution of 50 g of norbornene dissolved in 200 mL of toluene, and the reaction was allowed to proceed at room temperature for 24 hours. On completion of the reaction, the effluent was refined 3 times by reprecipitation with a toluene/methanol system, and dried to prepare an oligomer in a yield of 87%. The oligomer had a number-average molecular weight Mn of 1,900 and molecular weight distribution (Mw/Mn) of 1.72, both as the standard polystyrene, determined by GPC with chloroform as the solvent.

A solution of 10 g of the above oligomer dissolved in 100 mL of toluene was incorporated with 10 mg of chlorohydridecarbonyltris(triphenylphosphine) ruthenium [RuClH(CO)(PPh$_3$)$_3$], and the reaction was allowed to proceed in an autoclave at 120° C. and 20 atms for 20 hours under hydrogen. The whitely turbid effluent solution was put in 300 mL of methanol. The resulting white precipitates were washed several times with methanol and dried under a vacuum, to obtain a white solid hydrogenated oligomer in a yield of 9.5 g.

The oligomer was analyzed by 1H-NMR to confirm that the peak (5 to 7 ppm) relevant to the olefin double bond completely disappeared. Properties of the hydrogenated oligomer are given in Table 1.

Oligomer Synthesis Example 2

A solution was prepared by dissolving 50 g of 5-norbornene-2-methanol in 200 mL of chloroform, to which 166 mg (1/2,000 equivalents of norbornene) of the ruthenium complex represented by the formula (7) and 5 g of 1-hexene, and the reaction was allowed to proceed with stirring for 24 hours. On completion of the reaction, the effluent was refined 3 times by reprecipitation with a toluene/methanol system, and dried to prepare an oligomer in a yield of 85%.

The oligomer had a number-average molecular weight Mn of 1,100 and molecular weight distribution (Mw/Mn) of 2.10, both as the standard polystyrene, determined by GPC with chloroform as the solvent.

A solution of 10 g of the above oligomer dissolved in 100 mL of THF was incorporated with 10 mg of chlorohydridecarbonyltris(triphenylphosphine) ruthenium [RuClH(CO)(PPh$_3$)$_3$], and the reaction was allowed to proceed in an autoclave at 120° C. and 15 atms for 20 hours under hydrogen. The whitely turbid effluent solution was put in 300 mL of methanol. The resulting white precipitates were washed several times with methanol and dried under a vacuum, to obtain a white solid hydrogenated oligomer in a yield of 9.3 g.

The oligomer was analyzed by 1H-NMR to confirm that the peak (5 to 7 ppm) relevant to the olefin double bond completely disappeared. Properties of the hydrogenated oligomer are given in Table 1.

Oligomer Synthesis Example 3

A solution was prepared by dissolving 0.558 g (1/80 equivalents of norbornene) of 1-hexene and 219 mg (1/2,000 equivalents of norbornene) of the ruthenium complex represented by the formula (8) in 10 mL of toluene, and put slowly in a solution of 50 g of norbornene dissolved in 200 mL of toluene, and the reaction was allowed to proceed at room temperature for 24 hours. On completion of the reaction, the effluent was refined 3 times by reprecipitation with a toluene/methanol system, and dried to prepare an oligomer in a yield of 87%.

The oligomer had a number-average molecular weight Mn of 13,000 and molecular weight distribution (Mw/Mn) of 2.52, both as the standard polystyrene, determined by GPC with chloroform as the solvent.

A solution of 10 g of the above oligomer dissolved in 100 mL of toluene was incorporated with 10 mg of chlorohydridecarbonyltris(triphenylphosphine) ruthenium [RuClH(CO)(PPh$_3$)$_3$], and the reaction was allowed to proceed in an autoclave at 120° C. and 20 atms for 20 hours under hydrogen. The whitely turbid effluent solution was put in 300 mL of methanol. The resulting white precipitates were washed several times with methanol and dried under a vacuum, to obtain a white solid hydrogenated oligomer in a yield of 9.9 g.

The oligomer was analyzed by 1H-NMR to confirm that the peak (5 to 7 ppm) relevant to the olefin double bond completely disappeared. Properties of the hydrogenated oligomer are given in Table 1.

Oligomer Synthesis Example 4

A solution was prepared by dissolving 15.5 g (1/3.5 equivalents of norbornene) of allyl acetate and 50 g of norbornene in 200 mL of toluene, to which 227 mg (1/2,000 equivalents of norbornene) of the ruthenium complex represented by the formula (9), and the reaction was allowed to proceed at room temperature for 24 hours. On completion of the reaction, the effluent was refined 3 times by reprecipitation with a toluene/methanol system. The product was analyzed by 1H-NMR to confirm that acetoxy group was included at the polymer terminal by the presence of the proton peak of the unsaturated bond adjacent to the acetoxy group. Yield was 91%.

The resulting oligomer had a number-average molecular weight Mn of 4,600 and molecular weight distribution (Mw/Mn) of 1.81, both as the standard polystyrene, determined by GPC with chloroform as the solvent. Properties of the hydrogenated oligomer are given in Table 1.

Oligomer Synthesis Example 5

A solution was prepared by dissolving 25 g of the product prepared in OLIGOMER SYNTHESIS EXAMPLE 4 in 400 mL of toluene, to which 40 g of a 10% by weight methanol solution of sodium methoxide, and the mixture was stirred at room temperature for 18 hours. The mixture was then incorporated with 400 mL of methanol, and refined 2 times by reprecipitation with a toluene/methanol system and dried. The product was analyzed by 1H-NMR and IR spectral analysis to confirm that acetoxy group was totally converted into hydroxyl group. The yield in the hydroxylation process was 98%.

The resulting oligomer had a number-average molecular weight Mn of 4,500 and molecular weight distribution (Mw/Mn) of 1.72, both as the standard polystyrene, determined by GPC with chloroform as the solvent. Properties of the oligomer are given in Table 1.

Oligomer Synthesis Example 6

A solution was prepared by dissolving 4.16 g (1/10 equivalents of 5-ethylidene-2-norbornene) and 0.068 g (1/5,000 equivalents of 5-ethylidene-2-norbornene) of the ruthenium complex represented by the formula (7) in 10 mL of toluene, and put slowly in a solution of 50 g of 5-ethylidene-2-norbornene dissolved in 200 mL of toluene, and the reaction was allowed to proceed at room temperature for 24 hours. On completion of the reaction, the effluent was refined 3 times by reprecipitation with a toluene/methanol system, and dried to prepare an oligomer in a yield of 85%. The oligomer had a number-average molecular weight Mn of 2,200 and molecular weight distribution (Mw/Mn) of 1.81, both as the standard polystyrene, determined by GPC with chloroform as the solvent.

A solution of 10 g of the above oligomer dissolved in 100 mL of toluene was incorporated with 10 mg of chlorohydridecarbonyltris(triphenylphosphine) ruthenium [RuClH(CO)(PPh$_3$)$_3$], and the reaction was allowed to proceed in an autoclave at 130° C. and 20 atms for 24 hours under hydrogen. The whitely turbid effluent solution was put in 300 mL of methanol. The resulting white precipitates were washed several times with methanol and dried under a vacuum, to obtain a white solid hydrogenated oligomer in a yield of 9.4 g.

The oligomer was analyzed by 1H-NMR to confirm that the peak (5 to 7 ppm) relevant to the olefin double bond completely disappeared. Properties of the hydrogenated oligomer are given in Table 1.

Oligomer Synthesis Example 7

A solution of 10 g of the oligomer prepared in OLIGOMER SYNTHESIS EXAMPLE 5 in 100 mL of toluene was incorporated with 10 mg of chlorohydridecarbonyltris(triphenylphosphine) ruthenium [RuClH(CO)(PPh$_3$)$_3$], and the reaction was allowed to proceed in an autoclave at 120° C. and 20 atms for 20 hours under hydrogen. The whitely turbid effluent solution was put in 300 mL of methanol. The resulting white precipitates were washed several times with methanol and dried under a vacuum, to obtain a white solid hydrogenated oligomer in a yield of 9.5 g.

The oligomer was analyzed by 1H-NMR to confirm that the peak (5 to 7 ppm) relevant to the olefin double bond completely disappeared. Properties of the hydrogenated oligomer are given in Table 1.

TABLE 1

| | Oligomer No. | | | | | | |
|---|---|---|---|---|---|---|---|
| | 1 | 2 | 3 | 4 | 5 | 6 | 7 |
| Number-average molecular weight | 1900 | 2400 | 13000 | 4600 | 4500 | 2200 | 4500 |
| Softening point | 98 | 101 | 135 | 75 | 79 | 85 | 101 |

Example 1

A thermoplastic norbornene-based resin composition was prepared by incorporating 5 parts by weight of the oligomer prepared in OLIGOMER SYNTHESIS EXAMPLE 1 in 100 parts by weight of the base polymer of ZEONOR™ 1600 (Zeon). The composition was predried at 70° C. for 3 hours, and extruded by a single-screw extruder (50 mm in diameter, L/D=28) under the conditions of coat hanger type T-die width: 500 mm, extrusion temperature: 250 to 295° C., cooling roll temperature: 120° C. and mold temperature: 280° C., into a 430 mm wide, 40 μm thick film. The evaluation results are given in Table 2.

Example 2

A thermoplastic norbornene-based resin composition was prepared by incorporating 5 parts by weight of the oligomer prepared in OLIGOMER SYNTHESIS EXAMPLE 2 in 100 parts by weight of the base polymer of ARTON™ D4532G (JSR). The composition was extruded in a manner similar to that for EXAMPLE 1 into a 430 mm wide, 40 μm thick film. The evaluation results are given in Table 2.

Example 3

A thermoplastic norbornene-based resin composition was prepared by incorporating 10 parts by weight of Escorez™ 228F (Tonex's petroleum resin, number-average molecular weight: 500, softening point: 135° C.) in 100 parts by weight of the base polymer of ZEONOR™ 1600 (Zeon). The composition was predried at 110° C. for 3 hours, and extruded by a single-screw extruder (50 mm in diameter, L/D=28) under the conditions of coat hanger type T-die width: 500 mm, extrusion temperature: 240 to-285° C., cooling roll temperature: 120° C. and mold temperature: 270° C., into a 430 mm wide, 40 μm thick film. The evaluation results are given in Table 2.

Example 4

A thermoplastic norbornene-based resin composition was prepared by incorporating 2 parts by weight of the oligomer prepared in OLIGOMER SYNTHESIS EXAMPLE 4 in 100 parts by weight of the base polymer of ZEONOR™ 1600 (Zeon). Then, the composition was dissolved in a cyclohexane/toluene (1/9) mixed solvent to prepare a 25% by weight solution. The solution was developed on a glass surface and dried to prepare a 40 μm thick film. The evaluation results are given in Table 2.

Example 5

A film was prepared in the same manner as in EXAMPLE 4, except that the oligomer was replaced by 1.5 parts by weight of the one prepared in OLIGOMER SYNTHESIS EXAMPLE 5. The evaluation results are given in Table 2.

Example 6

A film was prepared in the same manner as in EXAMPLE 1, except that the oligomer was replaced by the one prepared in OLIGOMER SYNTHESIS EXAMPLE 6. The evaluation results are given in Table 2.

Example 7

A film was prepared in the same manner as in EXAMPLE 1, except that the oligomer was replaced by the one prepared in OLIGOMER SYNTHESIS EXAMPLE 7. The evaluation results are given in Table 3.

Example 8

A film was prepared in the same manner as in EXAMPLE 3, except that ZEONOR™ 1600 (Zeon) was replaced by ARTON™ D4532G(JSR) and content of Escorez™ 228F (Tonex's petroleum resin, number-average molecular weight: 500, softening point: 135° C.) was changed from 10 to 25 parts by weight. The evaluation results are given in Table 3.

Comparative Example 1

A film of resin composition was prepared in the same manner as in EXAMPLE 1, except that the olefin-based compound was not incorporated The evaluation results are given in Table 3.

Comparative Example 2

A film of resin composition was prepared in the same manner as in EXAMPLE 2, except that the olefin-based compound was not incorporated The evaluation results are given in Table 3.

Comparative Example 3

A film of resin composition was prepared in the same manner as in EXAMPLE 1, except that the oligomer was replaced by the one prepared in OLIGOMER SYNTHESIS EXAMPLE 3. The evaluation results are given in Table 3.

TABLE 2

|  | EXAMPLE 1 | EXAMPLE 2 | EXAMPLE 3 | EXAMPLE 4 | EXAMPLE 5 | EXAMPLE 6 |
|---|---|---|---|---|---|---|
| Thermoplastic norbornene-based resin composition (parts by weight) | ZEONOR (100) | ARTON (100) | ZEONOR (100) | ZEONOR (100) | ZEONOR (100) | ZEONOR (100) |
| Olefin-based compound (parts by weight) | Oligomer 1 (5) | Oligomer 2 (5) | Escorez (5) | Oligomer 4 (2) | Oligomer 5 (1.5) | Oligomer 6 (5) |
| Melt viscosity at 230° C. (Pa · s) | 1100 | 1650 | 1000 | 1200 | 1200 | 1100 |
| Melt viscosity at 280° C. (Pa · s) | 40 or less | 40 or less | 40 or less | 40 or less | 40 or less | 40 or less |
| Glass transition temperature (° C.) | 143 | 142 | 135 | 146 | 145 | 140 |
| Total light transmittance (%) | 93 | 93 | 93 | 93 | 93 | 93 |
| Haze (%) | 0.1 | 0.2 | 0.1 | 0.5 | 0.4 | 0.1 |
| Tear strength (N) | 2.5 | 2.7 | 2.1 | 2.7 | 2.7 | 2.5 |
| Outer appearances | ⊚ | ⊚ | ○ | ⊚ | ⊚ | ⊚ |
| Moisture permeability (g/m²/day/40 μm thick) | 13 | 120 | 9 | 20 | 25 | 51 |
| Peel strength (N/25 mm) | 1.95 | 2.68 | 1.51 | 2.51 | 2.65 | 2.62 |

TABLE 3

|  | EXAMPLE 7 | EXAMPLE 8 | COMPARATIVE EXAMPLE 1 | COMPARATIVE EXAMPLE 2 | COMPARATIVE EXAMPLE 3 |
|---|---|---|---|---|---|
| Thermoplastic norbornene-based resin composition (parts by weight) | ZEONOR (100) | ARTON (100) | ZEONOR (100) | ARTON (100) | ZEONOR (100) |
| Olefin-based compound (parts by weight) | Oligomer 7 (5) | Escorez (25) | — | — | Oligomer 3 (5) |
| Melt viscosity at 230° C. (Pa · s) | 1100 | 700 | 15000 or more | 15000 or more | 15000 or more |
| Melt viscosity at 280° C. (Pa · s) | 40 or less | 40 or less | 1000 | 700 | 800 |
| Glass transition temperature (° C.) | 144 | 135 | 155 | 145 | 153 |
| Total light transmittance (%) | 93 | 93 | 91 | 92 | 88 |
| Haze (%) | 0.1 | 9.2 | 0.05 | 0.1 | 6 |
| Tear strength (N) | 2.5 | 2.5 | 3.3 | 3.1 | 3.3 |
| Outer appearances | ◎ | ○ | x | x | x |
| Moisture permeability (g/m²/day/40 μm thick) | 45 | 103 | 5 | 105 | 6 |
| Peel strength (N/25 mm) | 2.68 | 1.52 | 1.08 | 1.42 | 1.08 |

It is apparent from the results given in Tables 2 and 3 that the film of the thermoplastic norbornene-based resin composition of the present invention, prepared in each of EXAMPLES 1 to 8, is excellent not only in moldability at low temperature but also in total light transmittance, haze and tear strength.

The significant effect of the olefin-based compound is noted in each EXAMPLE, although the composition incorporated with ZEONOR™ as the thermoplastic norbornene-based resin shows a lower moisture permeability than the one incorporated with ARTON™. Moreover, the composition containing the olefin-based compound at a relatively low content (prepared in each of EXAMPLES 1 to 7) loses glass transition temperature less, which is accompanied by favorable effects on transparency, heat resistance, moldability at low temperature, among others. By contrast, the one containing the olefin-based compound at a higher content (composition prepared in EXAMPLES 8), although higher in total light transmittance, shows reduced transparency and higher haze value. The composition which contains the olefin-based compound having an unsaturated structure (prepared in each of EXAMPLES 4 and 5) shows a slightly higher haze value, conceivably resulting from oxidation-induced degradation of the unsaturated bond during the molding process.

By contrast, the composition free of an olefin-based compound (prepared in each of COMPARATIVE EXAMPLES 1 and 2) has a high melt viscosity to deteriorate its moldability, and gives a film of unsatisfactory outer appearances. On the other hand, the composition incorporated with an olefin-based compound having an excessively high number-average molecular weight (prepared in COMPARATIVE EXAMPLE 3) not only has a high melt viscosity to deteriorate its moldability but also gives a film of unsatisfactory optical performance and outer appearances.

The effect of oligomer used as the olefin-based compound is viewed from moisture permeability. It increases moisture permeability moderately from 105 to 120, when incorporated in ARTON™, which has a polar group (compare the composition prepared in EXAMPLE 2 with that prepared in COMPARATIVE EXAMPLE 2). By contrast, it drastically increases moisture permeability about 3 to 10 times from 5 to 13–51, when incorporated in ZEONOR™, which has not a polar group (compare the composition prepared in each of EXAMPLES 1, 4 and 5 to 7 with that prepared in COMPARATIVE EXAMPLE 1).

Similarly, the effect is viewed from adhesiveness. It increases tear strength moderately from 1.42 to 2.68, when incorporated in ARTON™, which has a polar group (compare the composition prepared in EXAMPLE 2 with that prepared in COMPARATIVE EXAMPLE 2). By contrast, it drastically increases tear strength about 2 to 2.5 times from 1.08 to 1.95–2.68, when incorporated in ZEONOR™, which has not a polar group (compare the composition prepared in each of EXAMPLES 1, 4 and 5 to 7 with that prepared in COMPARATIVE EXAMPLE 1).

As discussed above, the thermoplastic norbornene-based resin composition of the present invention has improved moldability, moisture permeability and adhesiveness, among others, and controlled in thermal degradation and defect formation during the melt molding process while retaining the inherent advantages of norbornene-based resin, e.g., heat resistance and transparency by incorporating any thermoplastic norbornene-based resin with a specific olefin-based compound. The thermoplastic norbornene-based resin composition of the present invention is useful, because it gives, when melt-molded, a molded article or optical film, e.g., phase-difference film or polarizing plate protective films, excellent in, e.g., transparency, heat resistance, low moisture absorptivity, low birefringence, moldability, moisture permeability and adhesiveness.

What is claimed is:

1. A melt-moldable, thermoplastic norbornene-based resin composition comprising a base polymer (A) composed of thermoplastic norbornene-based resin incorporated with an olefin-based compound (B) having a number-average molecular weight of 200 to 10,000 and softening point of 70 to 170° C.,
  wherein said olefin-based compound (B) is an alicyclic olefin or polymer thereof, and
  wherein said alicyclic olefin or polymer thereof has a polar group.

2. The thermoplastic norbornene-based resin composition according to claim 1, wherein said base polymer (A) is a norbornene-based resin having no polar group.

3. The thermoplastic norbornene-based resin composition according to claim 1, wherein said olefin-based compound (B) has a number-average molecular weight of 500 to 5,000.

4. The thermoplastic norbornene-based resin composition according to claim 1, wherein said alicyclic olefin or polymer thereof is a compound having a cyclopentene or norbornene ring.

5. The thermoplastic norbornene-based resin composition according to claim 4, wherein said alicyclic olefin or polymer thereof is a hydrogenation product.

6. The thermoplastic norbornene-based resin composition according to one of claims 1, 4 and 5, wherein said alicyclic olefin or polymer thereof is a product obtained by metathesis polymerization of a given norbornene-based monomer.

7. The thermoplastic norbornene-based resin composition according to one of claims 1, 4 and 5, wherein said alicyclic olefin or polymer thereof is a product obtained by metathesis polymerization of a given norbornene-based monomer in the presence of a chain transfer agent containing a functional group.

8. The thermoplastic norbornene-based resin composition of claim 1, wherein said polar group is a functional group having active hydrogen selected from the group consisting of carboxyl, hydroxyl, amino, amide and silyl group.

9. The thermoplastic norbornene-based resin composition of claim 1, wherein said olefin-based compound (B) is incorporated at 0.01 to 100 parts by weight per 100 parts by weight of said base polymer (A).

10. The thermoplastic norbornene-based resin composition of claim 9, wherein said olefin-based compound (B) is incorporated at 0.01 to 15 parts by weight per 100 parts by weight of said base polymer (A).

11. The thermoplastic norbornene-based resin composition of claim 9 or 10, wherein said olefin-based compound (B) is incorporated in said base polymer (A) to an extent to keep glass transition temperature reduced by 20° C. or less.

12. The thermoplastic norbornene-based resin composition of one of claims 1 to 3, 4 and 5, which has a melt viscosity of 3,000 Pa·s or less at 280° C. and 100 to 13,000 Pa·s at 230° C., and glass transition temperature of 100 to 190° C.

13. A molded article produced by melt molding of the thermoplastic norbornene-based resin composition of one of claims 1 to 3, 4 and 5.

14. An optical film produced by extrusion molding of the thermoplastic norbornene-based resin composition of one of claims 1 to 3, 4 and 5.

15. The optical film according to claim 14, which has a total light transmittance of 60 to 100%.

16. The optical film according to claim 14, which has a tear strength of 0.1N or more.

17. The optical film according to claim 14, which has a haze of 20% or less.

18. The thermoplastic norbornene-based resin composition of claim 2, wherein said alicyclic olefin or polymer thereof is a compound having a cyclopentene or norbornene ring.

19. The thermoplastic norbornene-based resin composition of claim 2, wherein said alicyclic olefin or polymer thereof is a hydrogenation product.

* * * * *

UNITED STATES PATENT AND TRADEMARK OFFICE
CERTIFICATE OF CORRECTION

PATENT NO. : 7,015,276 B2  
APPLICATION NO. : 10/381590  
DATED : March 21, 2006  
INVENTOR(S) : Morita et al.

It is certified that error appears in the above-identified patent and that said Letters Patent is hereby corrected as shown below:

<u>On the Cover Page:</u>
In item (30) change "Oct. 2, 2000     (JP) …………….. 2000-302558" to be -- Oct. 2, 2000     (JP) …………….. 2000-302558  
       Apr. 20, 2001     (JP) …………….. 2001-122551  
       Sept. 26, 2001     (JP) …………….. 2001-293148 --

Signed and Sealed this

Twenty-second Day of August, 2006

JON W. DUDAS  
*Director of the United States Patent and Trademark Office*